(12) United States Patent
Petela et al.

(10) Patent No.: US 9,115,667 B2
(45) Date of Patent: Aug. 25, 2015

(54) NOISE SUPPRESSOR

(71) Applicant: NOVA Chemicals (International) S.A., Fribourg (CH)

(72) Inventors: Grazyna Petela, Calgary (CA); Kamal K Botros, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

(21) Appl. No.: 14/264,352

(22) Filed: Apr. 29, 2014

(65) Prior Publication Data

US 2014/0332311 A1 Nov. 13, 2014

(30) Foreign Application Priority Data

May 8, 2013 (CA) .................................. 2815312

(51) Int. Cl.
*E04F 17/04* (2006.01)
*F02K 1/34* (2006.01)

(52) U.S. Cl.
CPC ........................................ *F02K 1/34* (2013.01)

(58) Field of Classification Search
CPC ........................................................ F24F 13/24
USPC ................................................................ 181/224
See application file for complete search history.

(56) References Cited

U.S. PATENT DOCUMENTS

| | | | | |
|---|---|---|---|---|
| 1,666,257 A * | 4/1928 | Furnivall et al. | ............... | 181/258 |
| 2,545,682 A * | 3/1951 | Bergman | ...................... | 181/258 |
| 5,728,979 A * | 3/1998 | Yazici et al. | .................. | 181/224 |
| 6,343,672 B1 * | 2/2002 | Petela et al. | .................. | 181/224 |
| 6,968,923 B2 * | 11/2005 | Schmaeman | ................. | 181/252 |
| 6,991,043 B1 * | 1/2006 | Chen | .............................. | 173/169 |
| 7,451,855 B2 | 11/2008 | Wang | | |
| 8,550,208 B1 * | 10/2013 | Potokar | ......................... | 181/212 |
| 2003/0221904 A1 * | 12/2003 | Ludwig et al. | ................ | 181/224 |
| 2009/0166126 A1 * | 7/2009 | Patsouras et al. | ............. | 181/224 |

OTHER PUBLICATIONS

Aste, T., Weaire, D.; The Pursuit of Perfect Packing, London, Institute of Physics Publishing, ISBN 0-7503-0648-3, Section 2 (Loose Change and Hard Packing), 2000, pp. 5-19.
Aste, T., Weaire, D.; The Pursuit of Perfect Packing, London, Institute of Physics Publishing, ISBN 0-7503-0648-3, Section 3 (Hard problems with hard spheres), 2000, pp. 20-34.
Conway, J.H., Sloane, J.A.; Sphere packings, lattices, and groups; "Lamianted Lattices", Springer, 1999, Section 6.3, pp. 157-180.
Sloane, N.J.A., The Packing of Spheres, Scientific American 250, 1984, pp. 116-125.

* cited by examiner

*Primary Examiner* — Forrest M Phillips
(74) *Attorney, Agent, or Firm* — Julie L. Heinrich

(57) ABSTRACT

In one embodiment of the invention, the noise of a supersonic jet of gas venting from a lower stack having a flow control means may be reduced by at least about 20 dBA by attaching an upper stack to the lower stack, said upper stack being packed with granulae to provide a bed height at least one diameter of the upper stack the cross section area of the interstitial voids between the granulae being at least about 2.25 times larger than the cross section area of the flow controlling means installed in the lower stack. The said bed is contained in the upper stack and kept in place by suitable upper and lower retainers such as, for example, a mesh or a perforated plate.

20 Claims, 4 Drawing Sheets

NOISE SUPPRESSOR

FIELD

The various embodiments of the present invention relate to noise suppression of gas jets vented from industrial installations, while maintaining the same venting flow rate of the discharged jet. With the changing demographics, particularly in North America, hearing impairment is becoming a more visible disability. As a result, there is a desire to reduce the level of noise in industrial installations such as gas transmission facilities and chemical processing and manufacturing plants. While wearing hearing protection may help in some cases it has the disadvantage of limiting the communications between individuals who wear them. There is a need for improved industrial noise suppressors, for example, for applications to sonic or supersonic gas venting.

BACKGROUND

U.S. Pat. No. 1,666,257 issued Apr. 17, 1928 to Furnivall et al., teaches an exhaust silencer. The silencer is inserted into an exhaust pipe for engines and the like. The silencer comprises an inverted conical casing comprising a wire mesh placed in the exhaust pipe. The cone has a vertical circumferential wall defining a pipe extending above the base of the inverted cone and a screen mesh over the outlet of the pipe distant from the base of the cone. The cone and the pipe are filled with steel balls (e.g., ball bearings). The patent does not teach or suggest the embodiment of the present invention which has, along with other possible improvements over the state of the art, eliminated the essential inverted cone of the patent.

U.S. Pat. No. 2,545,682, issued Mar. 20, 1951 to Bergman, assigned to Universal Oil Products Company, teaches a silencer in an exhaust line above a pressure chamber such as a catalyst regenerator. The silencer comprises a cylinder having a conical top and bottom ends. At each end of the cylinder is a perforated plate or grating (Col. 3, lines 35 to 40). The column is packed with iron or ceramic balls. There are openings on the sides of the cylinder to add or remove balls. Additionally, the cylinder has valves to control the pressure within the cylinder. One embodiment of the present invention has, along with other possible improvements over the state of the art, eliminated the valves to control the pressure in the cylinder.

More recently, U.S. Pat. No. 6,343,672 issued Feb. 5, 2002 to Petela et al., assigned to NOVA Gas Transmission Limited, teaches a blow down and venting jet noise suppressor. The diffuser at the upper end of the device comprises an inverted truncated cone having a grid at each end. The inverted truncated cone is packed with spherical particles. One embodiment of the present invention has, along with other possible improvements over the state of the art, eliminated the essential inverted cone and the "swirler" below the inverted cone.

U.S. Pat. No. 7,451,855, issued Nov. 18, 2008 to Wang, teaches an acoustic absorbing device comprising a number of sound absorbing panels within a cylindrical hood. The sound absorbing panels have multiple perforations there through to help absorb sound. There is no particulate packing in the device. The patent teaches away from the many embodiments of the present invention.

In some embodiments, the present invention seeks to provide a simple effective means for suppression of noise from industrial exhausts or jets venting to the atmosphere.

SUMMARY

In one embodiment, the present invention provides a noise suppressor for a gas jet comprising in cooperating arrangement:

i) a lower vent stack, for example, cylindrical, having installed at its upper end a flow controlling means having a total open, (or free), cross sectional area less than the cross sectional area of the lower vent stack;

ii) above and co-operating with said lower vent stack, an upper vent stack, for example, cylindrical, having an inlet proximate said flow controlling means, a cross section area larger than the total open (or free) cross sectional area of said flow controlling means and sufficient to cause supersonic gas flow, absent component (iii) below, at the stack exit;

iii) a bed of inert, rigid (solid or hollow) and tightly packed granulae (or particles), contained in the upper stack, said bed having the height equivalent to at least one diameter of said upper stack, and having a total cross section area of interstitial voids among the granulae (or particles) not less than about 2.25 times the cross section area of the minimum total open operating cross sectional area of said flow controlling means.

In a further embodiment, said granulae filling is contained in the upper stack between a base and a cap, selected from a wire mesh, a perforated plate and a grid of parallel metal bars defining openings there through having a maximum characteristic dimension (e.g., diameter or width) not more than about 70% of the minimum characteristic dimension (e.g., size or diameter) of the inert granulae (or granular particles).

In a further embodiment, the inert granular packing comprises granulae of identical shape and size.

In a further embodiment, the inert granular packing comprises granulae of identical shape and size within a specified range of characteristic dimension.

In a further embodiment, the inert granular packing comprises the set of granulae of different shapes and sizes, such as, e.g., gravel.

In a further embodiment, the inert rigid (solid or hollow) granulae is selected from spheres, rods, pellets, prills, saddles, and rings of metal, ceramic and polymeric material having a melting temperature not less than about 50° C. greater than the temperature of the gas to be passed through the noise suppressor.

In a further embodiment, the granular packing is metal or ceramic spheres.

In a further embodiment, the inert granulae comprise a mixture of irregularly shaped or differently shaped particles, with size distribution within about ±25% of the average mean dimension.

In a further embodiment, the inert granulae are cleaned and sieved gravel having a size distribution within about ±25% of average sieve size.

In a further embodiment, the upper vent stack has a diameter substantially the same as the lower vent stack and has a length to diameter ratio of not less than about 10:1.

In an alternate embodiment, the upper vent stack has a diameter from about 2 to about 10 times the diameter of the lower vent stack and has a length to diameter ratio of not less than about 5:1.

In one embodiment, the present invention provides a method to reduce the noise from a supersonic jet by at least about 20, for example, about 25, or, for example, about 30 dBA by passing a jet through the noise suppressor as above.

DETAILED DESCRIPTION

Figure 1:
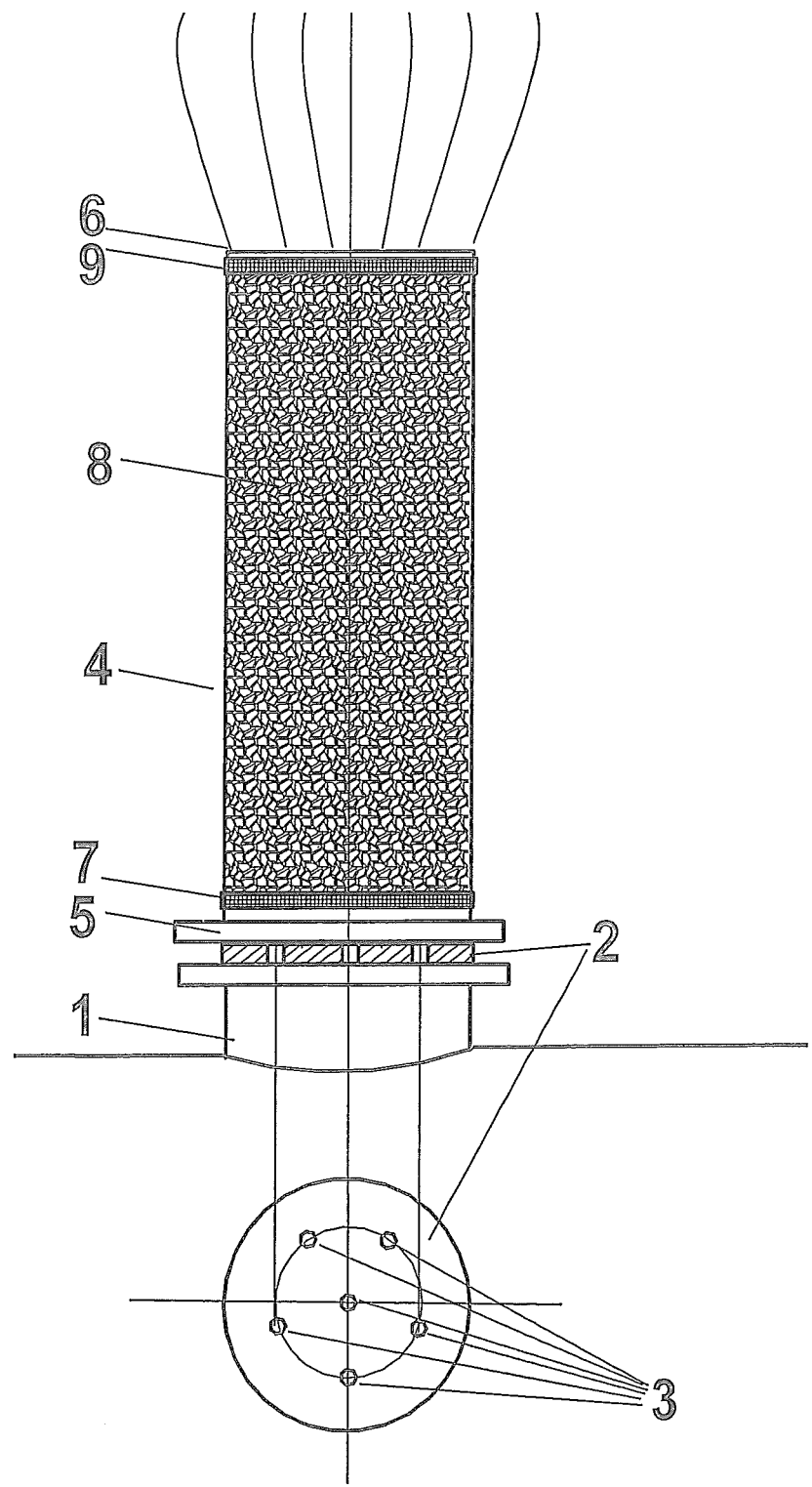
FIG. 1 is a schematic sectional drawing of a noise suppressor of an embodiment of the present invention, (Alternative 1), including a plan view of the orifice plate.
Figure 2:
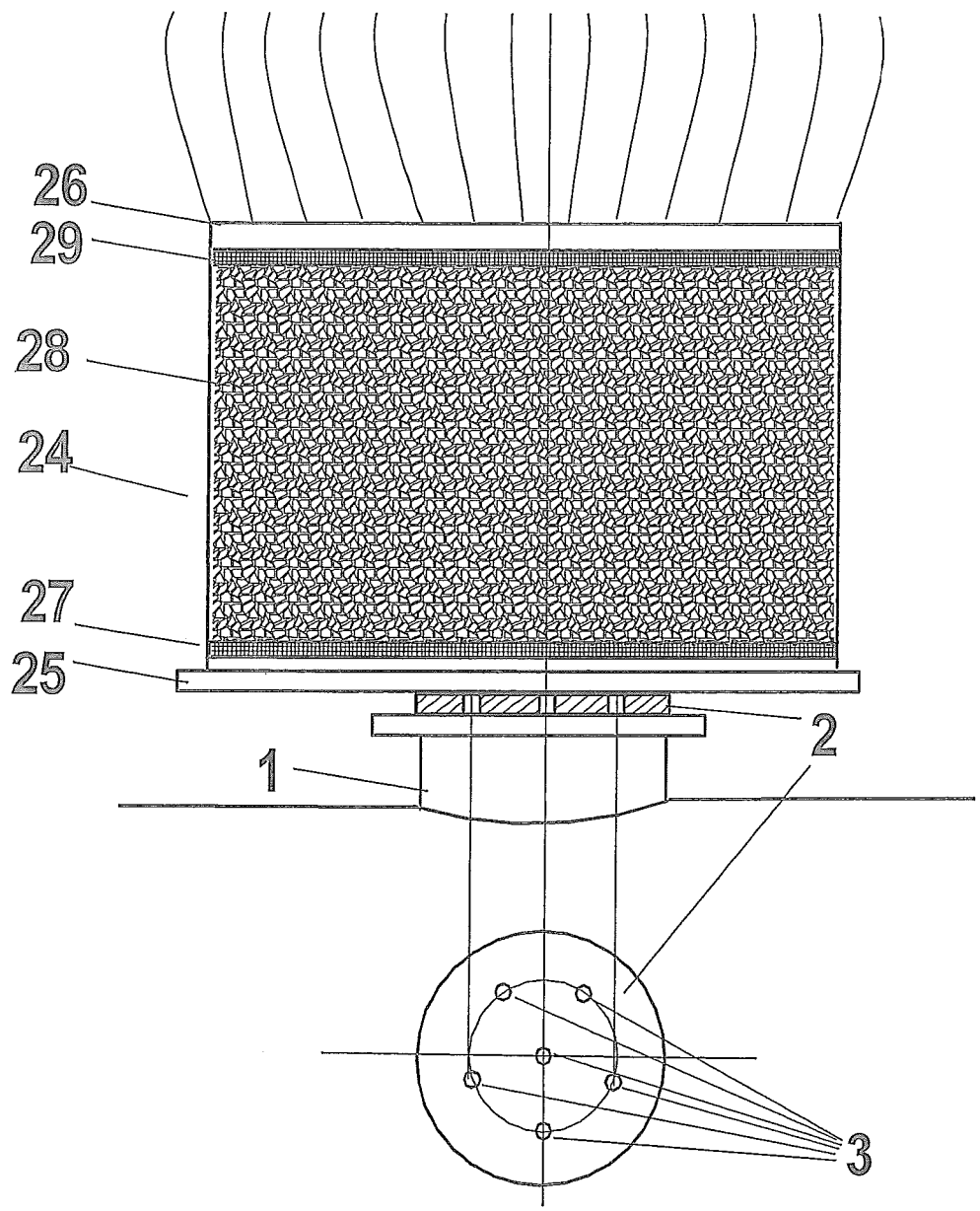
FIG. 2 is a schematic sectional drawing of an alternative geometry of a noise suppressor, (Alternative 2), of one embodiment of the present invention including a plan view of the orifice plate.

Some embodiments of the present invention can be described in accordance with FIGS. 1 and 2.

In FIG. 1, (referred to as Alternative 1), there is a substrate device 1, for example, a lower vent stack but potentially other substrates such as a tank or pressure vessel, having a choke flow control means in it, in this case, an orifice plate 2. An orifice plate may be present, but is not essential and other choking flow controlling means such as a valve could be used. The orifice plate 2 has a number of holes 3(in this case, 6 holes) there through. Above the orifice plate is an upper vent stack 4 having an inlet 5 proximate the orifice plate and an exit 6 distant from the orifice 2. Downstream of the inlet 5 is a perforated base 7 to support a bed 8 of rigid granulae (or granular packing). Distant from the base 7 and towards or proximate the exit 6 of the upper vent stack 4 is a perforated or open mesh cap 9 to contain and keep the granular packing in place at all times, and especially during venting.

The perforated base (7) and cap (9) may be selected from wire mesh, a perforated plate and a grid of parallel metal bars defining openings there through, having a maximum characteristic dimension (size) not more than about 70% of the characteristic dimension (diameter) of the inert granulae (granular packing). For example, the base and cap are wire mesh or grids (e.g., screens).

The granular bed (8) comprises inert rigid (solid or hollow) granular packing selected from spheres, rods, pellets, prills, saddles, and rings of metal, ceramic and polymeric material having a melting temperature not less than about 50° C. greater than the temperature of the gas to be passed through the noise suppressor. The granules need not be uniform and can be irregular in shape. Gravel cleaned and sieved to a relatively uniform size distribution can be used as granular packing. A relatively uniform size distribution means that not less than about 85 weight %, for example, more than about 95 weight % of the gravel particles are within the range limited by two consecutive sizes of commercially standard mesh or sieves. Some attention needs to be paid to the crush strength of the granular packing and the attrition properties, for example, for ceramic and similar material (some gravels, such as, limestone or sandstone may not be suitable). For example, the granular packing is ceramic, metal or metal alloy, for example, in the form of spheres. In some embodiments of the invention, the packing can comprise particles of one or more of the above material types.

The granular material in the bed is selected so that the cross sectional area of the interstitial voids between the particles is at least about 2.25 times larger than the cross sectional area of the flow controlling means in, the lower vent stack (2) or if an orifice plate is present, then of the sum of the cross sectional areas of all openings in the orifice plate. For regularly shaped particles, such as spheres, the cross sectional area of the interstitial voids may be calculated using the methods known to estimate close-packing of particles in a granular bed, [see, for example, Aste T., Weaire D., (2000), The Pursuit of Perfect Packing, London, Institute of Physics Publishing, ISBN 0-7503-0648-3, Section 2 (Loose change and hard packing) & Section 3 (Hard Problem with Hard Spheres); Conway J. H., Sloane N. J., Bannai E. Sphere Packings, Lattices and Groups, Springer 1999, Sec. 6.3; and Sloane N. J. H., (1984), The Packing of Spheres, Scientific American 250, pgs. 116-125]. Assuming that the spheres are tightly packed, the interstitial area will depend on diameter of the spheres.

In some instances, for example, where the packing is irregularly shaped (e.g., gravel), it may be simpler to experimentally determine the cross sectional area of the interstitial voids between granulae by filling a representative bed with a liquid, such as, water, measuring the volume and determining the change in volume with the change in the level of liquid in the bed to approximate the volume between particles, and then to determine the cross sectional area at different heights of the packing.

In the embodiment shown in FIG. 1, the upper vent stack 4, has an inner diameter substantially the same as the lower vent stack 1 and has a length to diameter ratio of not less than about 10:1.

The embodiment shown in FIG. 2 (referred to as Alternative 2), illustrates the same concept of the jet suppressor as has been shown in FIG. 1, but the suppressor comprises the upper stack with the alternative geometry. In the embodiment in FIG. 2, there is a substrate device 1, which may be a lower vent stack, having an orifice plate 2, with a certain number of holes, 3, in it, as has been also shown in FIG. 1. An orifice plate may be present but is not essential and other flow controlling means such as a valve could be used as well. Above the orifice plate 2 is an upper vent stack 24, which has a diameter larger than the diameter of the lower vent stack 1. The upper stack 24 has an inlet 25 proximate the orifice plate 2 and an exit 26 distant from the orifice plate. Near the inlet 25 (above the orifice plate, if present) is a perforated base 27 to support a bed 28 of granular packing. Distant from the orifice 2 towards or proximate the exit 26 of the upper vent stack 24 is a perforated cap 29 to prevent the loss of the granular packing.

The perforated base (27) and cap (29) may be selected from a wire mesh, a perforated plate and a grid of parallel metal bars defining openings there through having a minimum size not more than half the size (diameter) of the inert granular packing. For example, the base and cap are wire mesh or grids (e.g., screens).

In the embodiment shown in FIG. 2, the upper vent stack 24 has an inner diameter from about 2 to about 10 times the diameter of the lower vent stack 1 and has a length to diameter ratio of not less than about 5:1.

The bed is comprised of the granulae (particulates) as has been described for FIG. 1 and the interstitial volume can be estimated as has been described earlier for FIG. 1.

In one embodiment of the present invention, the bed of granular material is tightly packed. That is, the granular material is not simply poured into the upper vent stack. Rather, the granular material is placed in the upper vent stack and the stack is subject to vibration (shaking) to pack the bed to achieve a tight and uniform packing.

One factor to ensure the efficient operation of some embodiments of the present invention is the adequate pressure drop as the gas flows through tortuous passages between granular material contained in the bed. The pressure drop should be sufficient to reduce the gas velocity to sub-sonic level, while the gas exits the perforated cap at a pressure equal to the ambient pressure level.

The three following parameters of the granular bed may be optimized to achieve subsonic velocity of the gas jet exiting the upper vent stack:

the bed height, the bed diameter (i.e., the upper vent stack internal diameter), the average size of granular particles.

In the considered design cases when the gas flow rate through the bed should remain exactly as the gas flow rate through the lower stack, the granular bed does not constrain the flow rate—in other words, the gas flow velocity through the bed is substantially reduced but not the gas flow rate. Under some design constraints of some embodiments, the upper stack may be shortened and, hence, increase its cross sectional area, as has been shown in FIG. 2. This cross sectional area should be large enough that when the upper stack is filled with granular material, its interstitial cross section is substantially larger than the open (free) cross section area of the flow control means in the lower stack, such as, e.g., the total area of all openings in an orifice plate, a valve throat area, etc.

Two upper vent stacks were fabricated for noise suppressors, in accordance with the design alternatives shown in FIGS. 1 and 2. For the noise suppressor constructed according to FIG. 1, the upper vent stack had a height of 281 mm and a diameter of 9 mm. For noise suppressor constructed according to FIG. 2, the upper vent stack had a height of 140 mm and a diameter of 21 mm. Each of the stacks could be fitted onto a lower stack which had a diameter of 9 mm and which contained an orifice plate with 6 openings/holes drilled through the plate, each hole having a diameter of 0.7 mm. Five orifice openings were equally spaced on an annulus at about half the radius of the orifice plate and the sixth opening was centered in the orifice plate.

Further details are provided in the following examples. The following examples are merely illustrative of the invention and are not intended to be limiting. Unless otherwise indicated, all percentages are by weight unless otherwise specified.

EXAMPLES

Example 1

The upper stack of the noise suppressor, built according to Alternative 1 (FIG. 1), was assembled on the lower stack but, at first, no packing was placed in the upper stack. Compressed air flow at two rates ($m_1$=13.6 kg/h and $m_2$=8.8 kg/h) and at the respective two pressure levels ($p_1$=85 psig, $p_2$=50 psig), was passed through the upper and lower stacks. The noise levels of the vented air jets were measured in A-weighted decibels (dBA) using a Bruel & Kjaer® Sound Analyzer type 2250.

Next, the upper vent stack was packed with coarse granular packing comprising particles of cylindrical shape, having a length of 3.25 mm and a diameter of 3 mm. The stack was shaken until it was fully and tightly packed with the particles, and closed with the perforated cap.

Air was again passed through the device, marinating the identical mass flow rates $m_1$ and $m_2$ and the respective identical pressure levels $p_1$ and $p_2$.

The achieved overall noise reduction was of at least 30 dBA in both cases of the vented air jets.

Example 2

The upper stack of the noise suppressor, built according to Alternative 2 (FIG. 2), was tightly packed with finer granular packing having a cylindrical shape with length of about 3 mm and diameter of 2 mm. The stack was installed on the lower stack, just above the orifice plate and air was again passed through the device, maintaining the same flow ($m_1$ and $m_2$) pressure ($p_1$ and $p_2$) parameters as in Example 1.

The noise level was reduced by at least 30 dBA in both cases of the vented air jets.

Figure 3:
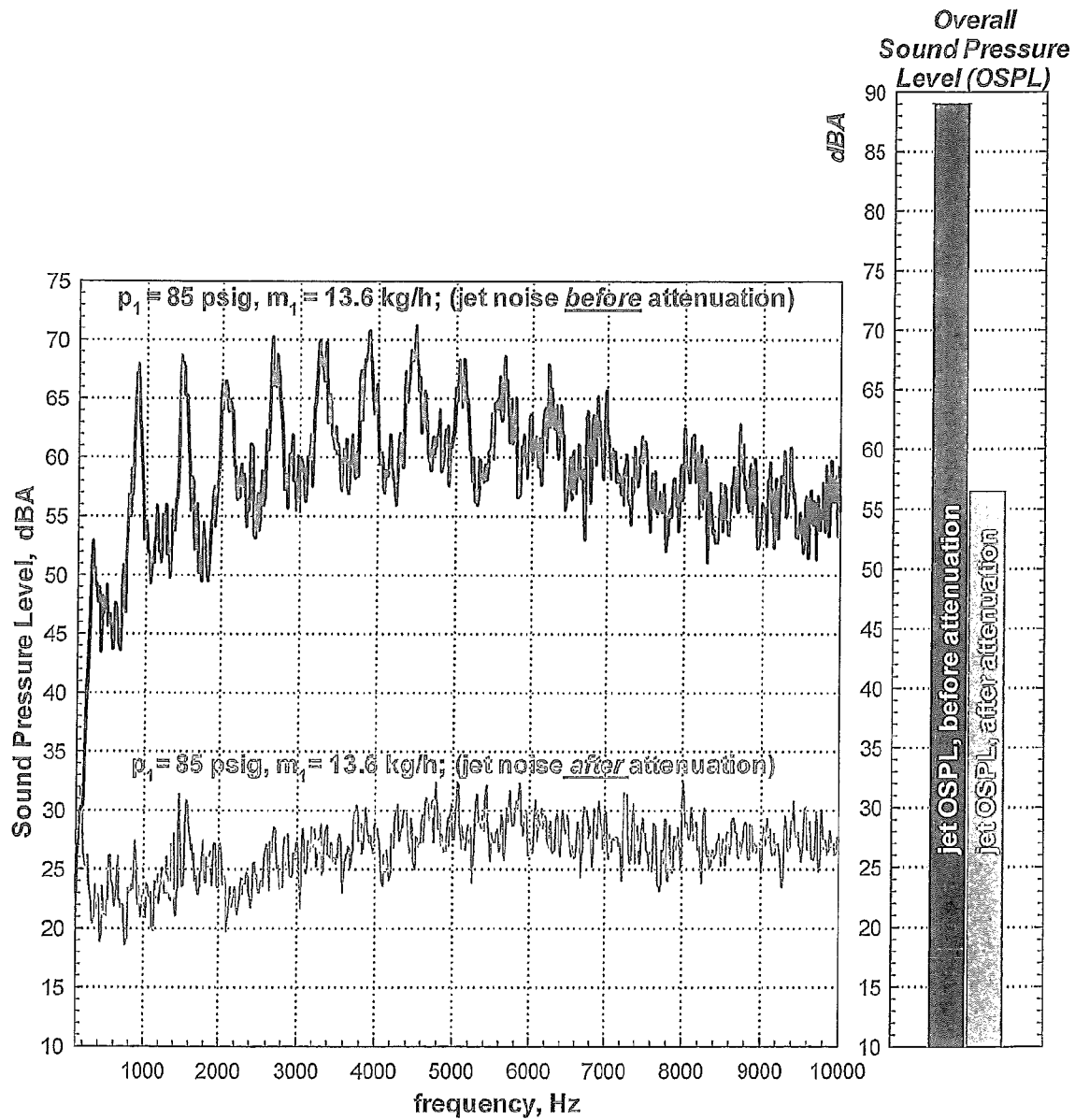
FIG. 3 is a plot of the jet noise attenuation achieved using a noise suppressor fabricated according to the embodiment of Alternative 2, for a gas jet with parameters as described in case 1.
Figure 4:
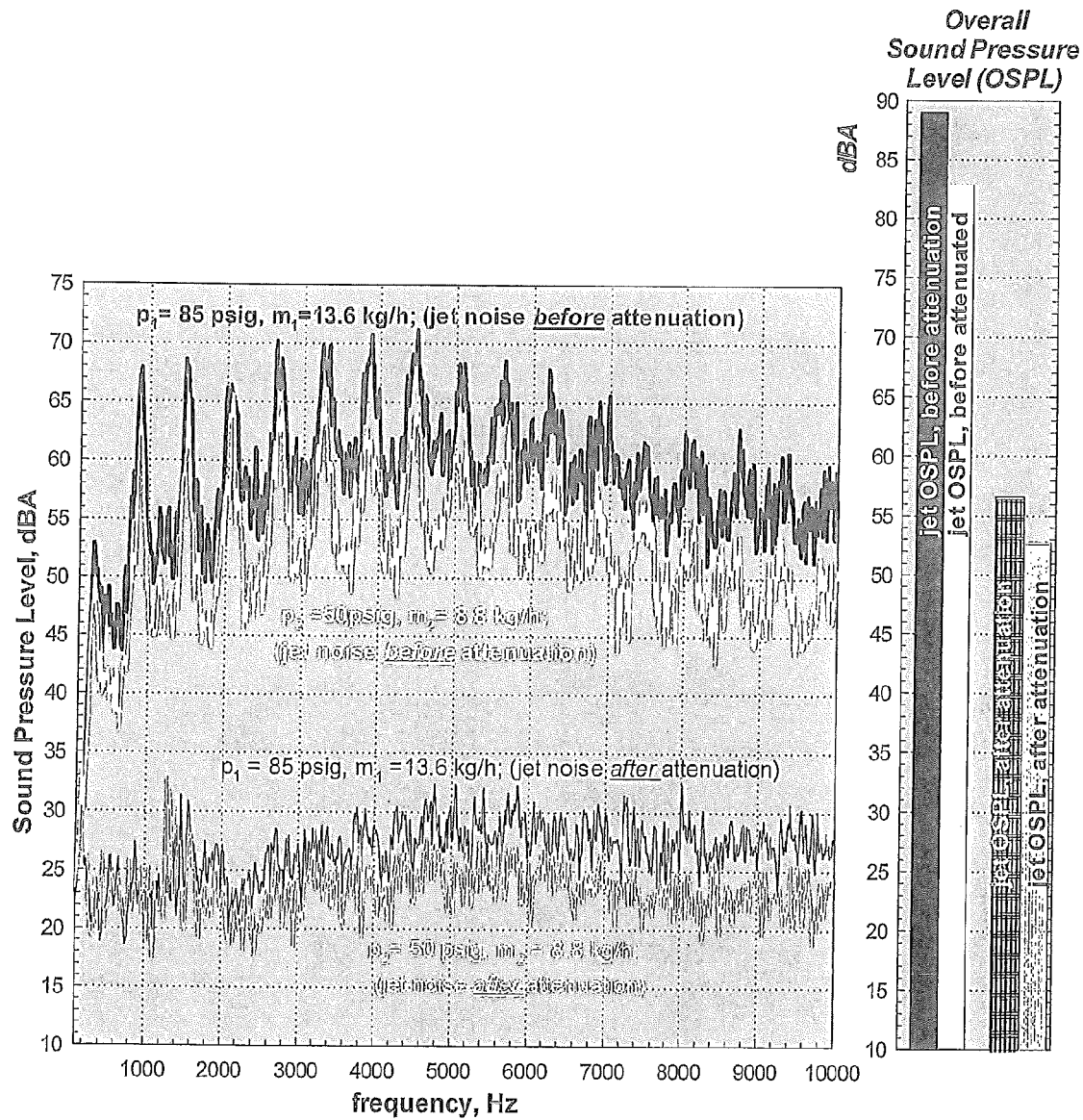
FIG. 4 is a plot of the jet noise attenuation achieved using the a suppressor fabricated according to the embodiment of Alternative 2, for gas jets with parameters as described in cases 1 and 2.

The experimental results of noise attenuation achieved in Example 2 are summarized in Table 1 and are graphically represented in FIGS. 3 and 4.

TABLE 1

| | Example 2 | | | |
|---|---|---|---|---|
| | Case1 | | Case2 | |
| Measured parameters | Unsilenced Jet | Silenced Jet | Unsilenced Jet | Silenced Jet |
| Gas flow rate, m, (kg/h) | 13.6 | 13.6 | 8.8 | 8.8 |
| Gas pressure, p, (Psig) | 85 | 85 | 50 | 50 |
| Overall noise level, OSPL, (dBA) | 89 | 56 | 83 | 52 |
| Noise attenuation, Δ, (dBA) | 33 | | 31 | |

It has to be emphasized that in the above examples of jet noise attenuation, using both design alternatives of the noise suppressor, air flow rates were not restricted by the presence of the granular material and the rates were maintained identical as those through the respective empty stacks.

The present invention has been described with reference to certain details of particular embodiments thereof. It is not intended that such details be regarded as limitations upon the scope of the invention except insofar as and to the extent that they are included in the accompanying claims.

What is claimed is:

1. A noise suppressor for gas jets comprising in cooperating arrangement:
    i) a lower vent stack having installed at its upper end a flow controlling means having a total open cross sectional area less than the cross sectional area of said lower vent stack;
    ii) above and co-operating with said lower vent stack an upper vent stack having a cross section area larger, relative to the open cross sectional area of said flow controlling means and sufficient to cause supersonic flow at the upper stack exit absent component iii) below, and a ratio of length to diameter of at least about 5:1;
    iii) within the upper vent stack, a bed of inert, rigid (solid or hollow) tightly packed granulae, said bed having the height at least equivalent to one diameter of said upper stack, and having a total cross sectional area of interstitial voids among the granulae not less than about 2.25 times the cross sectional area of the total open area of said flow controlling means.

2. The noise suppressor according to claim 1, wherein near the inlet for said upper vent stack there is a perforated base for said bed of inert, rigid (solid or hollow), tightly packed granulae, selected from a wire mesh, a perforated plate and a grid of parallel metal bars defining openings there through having a maximum size not more than about 70% of the characteristic dimension of the inert granular packing.

3. The noise suppressor according to claim 2 further comprising at the top of the bed a perforated cap selected from a wire mesh, a perforated plate and a grid of parallel metal bars defining openings there through having a maximum size not more than about 70% of the characteristic dimension of the inert granular packing.

4. The noise suppressor according to claim 3, wherein the inert granular packing comprises the particles of the same size and the same regular shape selected from solid spheres, rods, pellets, prills saddles, and rings, made of the material selected from metal, ceramic and polymeric materials, having a melting temperature not less than about 50° C. greater than the temperature of the gas to be passed through the noise suppressor.

5. The noise suppressor according to claim 3, wherein the inert granular packing comprises mixture of irregularly shaped or differently shaped particles, with size distribution within about ±25% of the average mean dimension.

6. The noise suppressor according to claim 3, wherein the inert granular packing is cleaned and sieved gravel having a size distribution within about ±25% of average sieve size.

7. The noise suppressor according to claim 4, wherein the upper vent stack has a diameter substantially the same as the lower vent stack and has a length to diameter ratio of not less than about 10:1.

8. The noise suppressor according to claim 4, wherein the upper vent stack has a diameter from about 2 to about 10 times the diameter of the lower vent stack and has a length to diameter ratio of not less than about 5:1.

9. The noise suppressor according to claim 7, wherein the granular packing is selected from granulae of ceramic or metal spheres, and sieved gravel.

10. The noise suppressor according to claim 8, wherein the granular packing is selected from granulae of ceramic or metal spheres, and sieved gravel.

11. The noise suppressor according to claim 9, wherein the flow control means is selected from a valve and an orifice plate.

12. The noise suppressor according to claim 10, wherein the flow control means is selected from a valve and an orifice plate.

13. The noise suppressor according to claim 11, wherein the flow control means is an orifice plate.

14. The noise suppressor according to claim 12 wherein the flow control means is an orifice plate.

15. A noise suppressor for gas jets comprising in cooperating arrangement:
i) a lower vent stack having installed at its upper end an orifice plate having a total open cross sectional area less than the cross sectional area of said lower vent stack;
ii) above and co-operating with said lower vent stack an upper vent stack having a cross section area larger, relative to the open cross sectional area of said orifice plate and sufficient to cause supersonic flow at the upper stack exit absent component iii) below, and a ratio of length to diameter of at least about 5:1;
iii) within the upper vent stack, a bed of inert, rigid (solid or hollow) tightly packed granulae, said bed having the height at least equivalent to one diameter of said upper stack, and having a total cross sectional area of interstitial voids among the granulae not less than about 2.25 times the cross sectional area of the total open area of said orifice plate;
iv) at the top of the bed a perforated cap selected from a wire mesh, a perforated plate and a grid of parallel metal bars defining openings there through having a maximum size not more than about 70% of the characteristic dimension of the inert granular packing wherein near the inlet for said upper vent stack there is a perforated base for said bed of inert, rigid (solid or hollow), tightly packed granulae, selected from a wire mesh, a perforated plate and a grid of parallel metal bars defining openings there through having a maximum size not more than about 70% of the characteristic dimension of the inert granular packing.

16. A method to reduce the noise from a supersonic jet by at least about 20 dBA, while preserving the vented gas flow rate, by passing the gas flow through a noise suppressor for gas jets comprising in cooperating arrangement:
i) a lower vent stack having installed at its upper end a flow controlling means having a total open cross sectional area less than the cross sectional area of said lower vent stack;
ii) above and co-operating with said lower vent stack an upper vent stack having a cross section area larger, relative to the open cross sectional area of said flow controlling means and sufficient to cause supersonic flow at the upper stack exit absent component iii) below, and a ratio of length to diameter of at least about 5:1;
iv) within the upper vent stack, a bed of inert, rigid (solid or hollow) tightly packed granulae, said bed having the height at least equivalent to one diameter of said upper stack, and having a total cross sectional area of interstitial voids among the granulae not less than about 2.25 times the cross sectional area of the total open area of said flow controlling means.

17. The method of claim 16, wherein near the inlet for said upper vent stack there is a perforated base for said bed of inert, rigid (solid or hollow), tightly packed granulae, selected from a wire mesh, a perforated plate and a grid of parallel metal bars defining openings there through having a maximum size not more than about 70% of the characteristic dimension of the inert granular packing.

18. The method of claim 16, wherein the noise suppressor further comprises at the top of the bed a perforated cap selected from a wire mesh, a perforated plate and a grid of parallel metal bars defining openings there through having a maximum size not more than about 70% of the characteristic dimension of the inert granular packing.

19. The method of claim 16, wherein the flow control means is selected from a valve and an orifice plate.

20. The method of claim 16, wherein the noise from a supersonic jet is reduced by at least about 30 dBA.

* * * * *